(12) United States Patent
Nugent

(10) Patent No.: US 9,152,917 B2
(45) Date of Patent: Oct. 6, 2015

(54) FRAMEWORK FOR THE EVOLUTION OF ELECTRONIC NEURAL ASSEMBLIES TOWARD DIRECTED GOALS

(71) Applicant: KnowmTech, LLC, Albuquerque, NM (US)

(72) Inventor: Alex Nugent, Santa Fe, NM (US)

(73) Assignee: KnowmTech, LLC, Santa Fe, NM (US)

( * ) Notice: Subject to any disclaimer, the term of this patent is extended or adjusted under 35 U.S.C. 154(b) by 0 days.

(21) Appl. No.: 14/276,551

(22) Filed: May 13, 2014

(65) Prior Publication Data

US 2015/0019467 A1  Jan. 15, 2015

Related U.S. Application Data

(63) Continuation of application No. 12/974,829, filed on Dec. 21, 2010, now Pat. No. 8,781,983.

(60) Provisional application No. 61/290,737, filed on Dec. 29, 2009.

(51) Int. Cl.
  *G06E 1/00* (2006.01)
  *G06E 3/00* (2006.01)
  *G06F 15/18* (2006.01)
  *G06N 3/063* (2006.01)
  *G06N 3/04* (2006.01)
  *G06N 3/08* (2006.01)

(52) U.S. Cl.
  CPC .................. *G06N 3/063* (2013.01); *G06N 3/04* (2013.01); *G06N 3/08* (2013.01)

(58) Field of Classification Search
  None
  See application file for complete search history.

(56) References Cited

U.S. PATENT DOCUMENTS

| | | | |
|---|---|---|---|
| 5,699,234 A * | 12/1997 | Saia et al. | 361/790 |
| 5,794,224 A | 8/1998 | Yufik | |
| 6,171,239 B1 * | 1/2001 | Humphrey | 600/372 |
| 6,889,216 B2 | 5/2005 | Nugent | |
| 6,995,649 B2 | 2/2006 | Nugent | |
| 7,028,017 B2 | 4/2006 | Nugent | |
| 7,039,619 B2 | 5/2006 | Nugent | |

(Continued)

OTHER PUBLICATIONS

Multiple Reward Signals in the Brain vol. 1 | December 2000 | 199 © 2000 Macmillan Magazines Ltd.*

(Continued)

*Primary Examiner* — Kakali Chaki
*Assistant Examiner* — Ababacar Seck
(74) *Attorney, Agent, or Firm* — Kermit D. Lopez; Luis M. Ortiz; Ortiz & Lopez, PLLC

(57) ABSTRACT

Methods and systems for the evolution of electronic neural assemblies toward directed goals. A compact computing architecture includes electronics that allows users of such an architecture to create autonomous agents, in real or virtual world and add intelligence to machines. An intelligent machine is composed of four basic modules: one or more sensors, one or more motors, a (Reward Input Output System) RIOS and a cortex. A number of genetically evolved detectors can project both to cortex and RIOS. At first the neurons within the cortex evolve to predict the structure of the sensory data followed by the structure of proprioceptive activations of its own motor system. Finally, once the cortex has learned its sensory and motor programs, it evolves to predict the reward signals, which comes in multiple channels but is dominated by the detection of the acquisition of free-energy.

20 Claims, 9 Drawing Sheets

(56) References Cited

U.S. PATENT DOCUMENTS

| | | |
|---|---|---|
| 7,107,252 B2 | 9/2006 | Nugent |
| 7,392,230 B2 | 6/2008 | Nugent |
| 7,398,259 B2 | 7/2008 | Nugent |
| 7,409,375 B2 * | 8/2008 | Nugent ............................ 706/26 |
| 7,412,428 B2 | 8/2008 | Nugent |
| 7,420,396 B2 | 9/2008 | Nugent |
| 7,426,501 B2 | 9/2008 | Nugent |
| 7,502,769 B2 | 3/2009 | Nugent |
| 7,599,895 B2 | 10/2009 | Nugent |
| 7,752,151 B2 | 7/2010 | Nugent |
| 7,827,130 B2 | 11/2010 | Nugent |
| 7,827,131 B2 | 11/2010 | Nugent |
| 2003/0177450 A1 | 9/2003 | Nugent |
| 2003/0236760 A1 | 12/2003 | Nugent |
| 2004/0039717 A1 | 2/2004 | Nugent |
| 2004/0153426 A1 | 8/2004 | Nugent |
| 2004/0162796 A1 | 8/2004 | Nugent |
| 2004/0193558 A1 | 9/2004 | Nugent |
| 2004/0249319 A1 * | 12/2004 | Dariush ............................ 601/5 |
| 2005/0015351 A1 | 1/2005 | Nugent |
| 2005/0149464 A1 | 7/2005 | Nugent |
| 2005/0149465 A1 | 7/2005 | Nugent |
| 2005/0151615 A1 | 7/2005 | Nugent |
| 2005/0256816 A1 | 11/2005 | Nugent |
| 2006/0036559 A1 | 2/2006 | Nugent |
| 2006/0184466 A1 * | 8/2006 | Nugent ............................ 706/15 |
| 2007/0005532 A1 | 1/2007 | Nugent |
| 2007/0022064 A1 | 1/2007 | Nugent |
| 2007/0117221 A1 | 5/2007 | Nugent et al. |
| 2007/0176643 A1 * | 8/2007 | Nugent ............................ 326/104 |
| 2008/0258773 A1 | 10/2008 | Nugent |
| 2009/0043722 A1 | 2/2009 | Nugent |
| 2009/0138419 A1 | 5/2009 | Nugent |
| 2009/0228415 A1 | 9/2009 | Nugent |
| 2009/0228416 A1 | 9/2009 | Nugent |
| 2010/0280982 A1 * | 11/2010 | Nugent ............................ 706/25 |
| 2011/0145179 A1 * | 6/2011 | Nugent ............................ 706/21 |

OTHER PUBLICATIONS

Multiple Reward Signals in the Brain Wolfram Schultz 2000 Macmillan Magazines Ltd.

Yufik, Y. M., "Virtual Associative Networks: A Framework for Cognitive Modeling," Brian and Values. Is a Biological Science of Values Possible (1998) Lawrence Erlbaum Associates, Inc., Pribram, K. H. (ed.), Mahway, NJ, pp. 109-177.

Yufik, Y. M. et al., "Swiss Army Knife and Ockham's Razor: Modeling and Facilitating Operator's Comprehension in Complex Dynamic Tasks," IEEE Transactions on Systems, Man, and Cybernetics—Part A: Systems and Humans (2002) 32(2):185-199.

Yufik, Y. M., "How the Mind Works: An Exercise in Pragmatism," Inst. of Med. Cybern. Inc. (2002) Gaithersburg, MD, 5 pages.

* cited by examiner

FIG. 4B          FIG. 4C

| +,+ | +,− | −,− | −,+ | LF | PS |
|---|---|---|---|---|---|
| + | + | + | + | 1 | G |
| + | + | + | − | 2 | C |
| + | + | − | + | 3 | F |
| + | + | − | − | 4 | B |
| + | − | + | + | 5 | D |
| + | − | + | − | 6 | |
| + | − | − | + | 7 | A |
| + | − | − | − | 8 | E |
| − | + | + | + | 9 | ~E |
| − | + | + | − | 10 | ~A |
| − | + | − | + | 11 | |
| − | + | − | − | 12 | ~D |
| − | − | + | + | 13 | ~B |
| − | − | + | − | 14 | ~F |
| − | − | − | + | 15 | ~C |
| − | − | − | − | 16 | ~G |

FIG. 9B  FIG. 9C

FRAMEWORK FOR THE EVOLUTION OF ELECTRONIC NEURAL ASSEMBLIES TOWARD DIRECTED GOALS

CROSS-REFERENCE AND PRIORITY TO PATENT APPLICATIONS

This patent application is a continuation of U.S. patent application Ser. No. 12/974,829 entitled "Framework for the Evolution of Electronic Neural Assemblies Toward Directed Goals," which was filed on Dec. 21, 2010 and is incorporated herein by reference in its entirety. U.S. patent application Ser. No. 12/974,829 claimed the benefit under 35 U.S.C. §119(e) of U.S. Provisional Patent Application Ser. No. 61/290,737 filed on Dec. 29, 2009, entitled "Framework For The Evolution of Neural Assemblies Toward Directed Goals," which is also hereby incorporated by reference in its entirety. This patent application therefore claims priority to the filing date of Dec. 29, 2009 of U.S. Provisional Patent Application Ser. No. 61/290,737.

FIELD OF THE INVENTION

Embodiments are generally related to artificial intelligence systems. Embodiments also relate to the self-organization of electronic neural assemblies toward directed goals.

BACKGROUND

Artificial intelligence (AI) deals with the science of making intelligent machines. AI covers areas including cognition, understanding, learning, knowledge representation, and searching. The idea of making a machine with intelligence has existed since at least the 1940's when the first computers were made. Many predictions have been made since then as to when an intelligent machine will be created.

The field of AI has gone through several periods when great breakthroughs were thought to be close at hand. However, each time more barriers were found that frustrated the goal of creating an intelligent machine. These barriers included the exponential growth of the search space, consequent slowness in the search process, inability to generalize knowledge, and encoding and storing knowledge in a useful and efficient way. These problems apply to the AI field in general.

Any machine that can accomplish its specific task in the presence of uncertainty and variability in its environment is generally regarded as an intelligent machine. The machine's ability to monitor its environment, allowing it to adjust its actions based on what it has sensed, is a prerequisite for intelligence. For the purpose of this disclosure, we assume this definition. Examples of minimally-intelligent machines include industrial robots equipped with sensors, computers equipped with speech recognition and voice synthesis, self-guided vehicles relying on vision rather than on marked roadways, and so-called smart weapons, which are capable of target identification. These varied systems include three major subsystems such as sensors, actuators, and control.

Since the physical embodiment of the machine or the particular task performed by the machine does not mark it as intelligent, the appearance of intelligence must come from the nature of the control or decision-making process that the machine performs. Given the centrality of control to any form of intelligent machine, intelligent control is the essence of an intelligent machine.

Artificial neural networks are systems composed of many nonlinear computational elements operating in parallel and arranged in patterns reminiscent of biological neural nets. The computational elements, or nodes, are connected via variable weights that are typically adapted during use to improve performance. Thus, in solving a problem, neural net models can explore many competing hypothesis simultaneously using massively parallel nets composed of many computational elements connected by links with variable weights.

In a neural network, "neuron-like" nodes can output a signal based on the sum of their input currents, the output being the result of an activation function. In a neural network, there exists a plurality of connections, which electrically couple a plurality of neurons. The connections serve duel functions of communication bridges and computational configuration and represent a synthesis of memory and processing. A network of such "neuron-like" nodes has the ability to process information in a variety of useful ways.

Neural networks that have been developed till date are largely software-based. A true physical neural network (e.g., the human brain) is massively parallel (and therefore very fast in computation), very adaptable, and extremely low power. For example, half of a human brain can suffer a lesion early in its development and not seriously affect its performance, it consumes only 10 watts, and is arguably the most intelligent artifact in existence. Software simulations are slow because a serial computer must calculate connection strengths. When the networks get larger (and therefore more powerful and potentially useful), the computational time and power consumption becomes enormous.

The implementation of neural network systems has lagged behind their theoretical potential due to the difficulties in building physical neural network hardware. This is primarily because of the large numbers of neurons and weighted connections required. The emulation of even of the simplest biological nervous systems would require neurons and connections numbering in the millions. Due to the difficulties in building such highly interconnected and adaptive structures, the currently available neural network hardware systems have not approached this level of complexity. Another disadvantage of hardware systems is that they typically are often custom designed and built to implement one particular neural network architecture and are not easily, if at all, reconfigurable to implement different architectures. A true physical neural network chip, for example, has not yet been designed and successfully implemented.

Therefore, a need exists for a new type of compact computing architecture that contains electronics unlike anything currently in production. Also, the new architecture should add intelligences to the machines and allow the users to create adaptive autonomous agents, in real or virtual worlds.

SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an artificial intelligence system.

It is a further aspect of the disclosed embodiments to provide for a framework for the self-organization of electronic neural assemblies toward directed goals.

It is yet another aspect of the disclosed embodiments to provide for a framework for the evolution of extrinsic logic states.

The aforementioned aspects and other objectives and advantages can now be achieved as described herein. A framework for evolution of electronic neural assemblies toward directed goals is disclosed. The new compact physical computing architecture contains electronics unlike anything currently in production. The new architecture adds intelligences to machines and allows users to create autonomous agents, in real or virtual worlds.

A brain is simply an environment for the development and production of algorithms. The brain uses the structure of the world and thermodynamic noise to evolve its own internal structure for the sole purpose of extracting free energy from the world. Detecting free energy is the act of dissipating it. To dissipate free energy, a prediction must be made, that is a specific sequence of space-time configurations has to be made to put the free energy detectors on the free energy. That sequence of space time configurations is really an algorithm and an algorithm is a prediction. An algorithm is the stable space-time sequences that reliably unlocks free-energy, and the dissipation of free energy is what stabilizes the algorithm The intelligent machine is composed of four basic modules: sensors (detectors), motors, RIOS, and cortex. A number of sensors project both to cortex and RIOS. At first, the neurons within the cortex evolve to predict the space-time structure of the sensory data forming small base circuits. These base circuits then evolve to predict the regularities of the motor system. Finally, once the cortex has learned its sensor and motor programs to form larger base circuits, it evolves these circuits to predict reward signals, which comes in multiple dimensions.

BRIEF DESCRIPTION OF THE FIGURES

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

FIGS. 4B and 4C illustrate graphical representations of a two variable system of FIG. 4A showing the distribution of voltage on two input lines over time in accordance with the disclosed embodiments;

FIG. 9B illustrates a graphical representation showing the input data distribution of cascaded circuit of FIG. 9A, in accordance with the disclosed embodiments;

FIG. 9C illustrates a graphical representation showing the output data distribution of cascaded circuit of FIG. 9A, in accordance with the disclosed embodiments;

DETAILED DESCRIPTION

Figure 1:
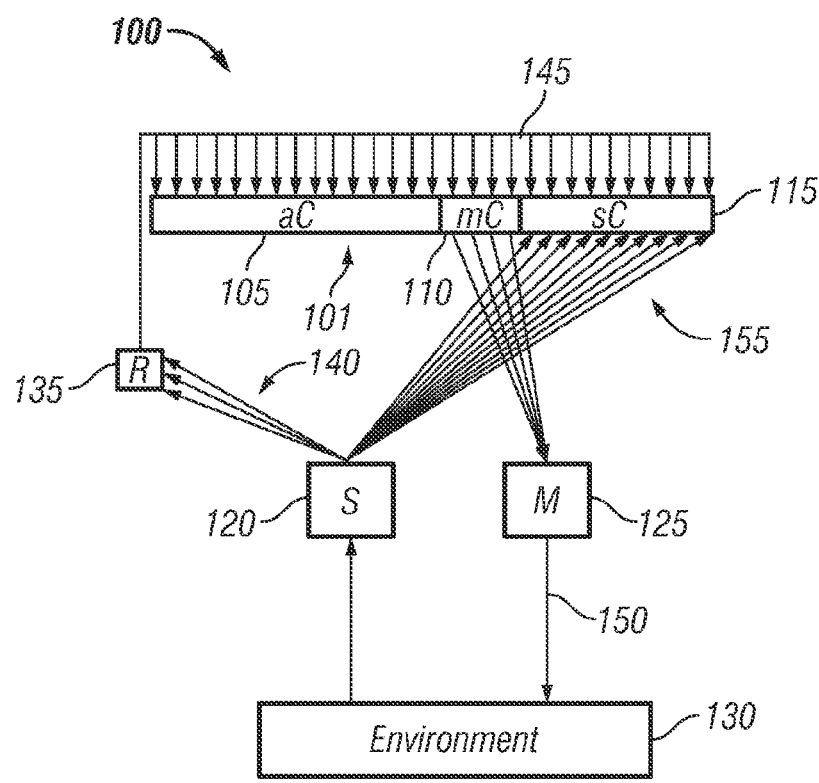
FIG. 1 illustrates a schematic diagram of the general control architecture and its interface with the environment, in accordance with the disclosed embodiments.

The particular values and configurations discussed in these non-limiting examples can be varied and are cited merely to illustrate at least one embodiment and are not intended to limit the scope thereof. Note that in FIGS. 1-3, identical or similar parts or elements are generally indicated by identical reference numerals.

BIOS, also known as the "Basic Input/output System", is a fundamentally necessarily part of a computer. Whereas the computer's software is universal, it is useless unless it can be initialized into a known state, given information about the world, and told what to do with that information. Something has to initialize the hardware and peripherals and load the software into working memory. Something is needed to "boot up" the system, a process known as bootstrapping. The intelligent machine must contain some minimal architecture to help it bootstrap. However, unlike a computer, an intelligent machine does not run software. Rather, an intelligent machine is pure adaptive hardware. We must thus provide some minimal structure to enable this adaptive hardware to bootstrap itself into a useful control system.

FIG. 1 illustrates a schematic diagram of an intelligent machine 100, in accordance with the disclosed embodiments. The intelligent machine 100 can be composed of four basic modules: one or more sensors (S) 120, motors (M) 125, RIOS (R) 135, and cortex 101. The cortex 101 is further divided into sensory cortex (sC) 115, motor cortex (mC) 110, and association cortex (aC) 105.

The intelligent machine 100 learns to interact autonomously within its environment 130. However, it is simply not possible for a system to accomplish this task without some help. The "genetic hints" guides the intelligent machine 100 in the right direction. For example, all are born with an innate ability to detect some "good" and "bad" situations. Whereas some may be computer programmers, or rock climbers, or accountants, there are some things that all agree on since their birth. For example, food is "good". Without these "genetic hints", the intelligent machine 100 would simply not know the boundaries that keep it alive and it would not learn how to live. If the intelligent machine 100 depletes its energy reserves it will die, so it is important that it drop whatever it is doing and focus on getting energy. On the same note, it is of no use to have a robot that acts in such a manner as to cause self-damage, so detectors have to be provided that give hints as to the maximal stresses its body can sustain. The sole function of the bootstrapping system is to analyze the incoming data stream for the signatures of energy or pain.

The intelligent machine 100 does not organize to acquire energy but rather the detection of the acquisition of free energy. The distinction between energy and free energy is simply that free energy is a form of energy that the intelligent machine 100 can use to do work. For example, an electrical outlet may be a source of free energy and an ampere meter may be a good detector of free energy acquisition. To distinguish between the measurement of the acquisition free energy and the energy itself, the measurement of the acquisition of free energy can be called reward 150. The output of the ampere meter is reward 150.

The raw sensory data 140 goes into the RIOS 135 and a real-time measure of reward signal 145 is output. The RIOS is "hardcoded" and is comparable to modern neural network classifiers. It's sole job is to detect the signatures of the acquisition of free energy. One can appreciate that these signatures may not be direction. For example, sugar is free energy and thus acquisition of sugar should result in a reward signal. However, the acquisition of free energy may result in an automated reflex such as a smile. Thus, the detecting a smile may be an indirect measure of energy acquisition. Once the sensory data has been processed by the RIOS 135, a single reward signal 145 is broadcast to numerous location throughout the cortex 101. The cortex 101 is the heart of the intelligent machine's adaptive learning capabilities.

Just as the heart of a computer is its memory and CPU, the heart of the intelligent machine 100 is its cortex 101. Cortex 101 can be thought of as generic resource that is used to solve problems. As a problem becomes more complex, more cortex 101 is needed to solve the problem. The cortex 101 receives direct input from the sensory channels 155, which project to the sensory cortex 115. The motor cortex 110 in turns projects to the motors 125. The cortex 101 learns about the environment 130 through the sensory and reward projections and affects its environment 130 through its motors 125.

The sensor 120 (or group of sensors) is a detector. Any features in the environment 130 that could possibly aid the intelligent machine 100 in its quest for free energy should have a sensor 120 to detect it. All sensors 120 are bundled together into many independent channels 155 and projected into the sensory cortex 115. The sensory cortex 115 can be further divided into regions to accept input from specific sensory modalities, for example, vision, audition, proprioception, smell, etc. A key property of a sensor 120 is that it can only detect the presence of its intended feature in the data stream. When a sensor activates or "fires", this means that the sensor is reasonably sure that its feature has been detected. When a sensor activates, it emits a pulse.

A motor 125 is essentially the inverse of a sensor 120. In the case of a physical instantiations, a motor 125 could be, for example, an actuator. In the virtual case, a motor 125 is any "command" that will affect the intelligent machine 100 circumstance in its virtual environment. In the case of an internet-robot, such a command could be clicking on a hyperlink. Motors 125 may have any number of ways in which they can be controlled and it is the function of intelligent machines to learn how to control them. However, a motor 125 must conform to a fixed-width pulse-encoding scheme, as this is the only output available from the cortex 101. For example, the motors 125 may encode an absolute position based on pulse frequency, or it may encode a relative movement based on aggregation of pulses, or it may encode a relative movement based on the inter-pulse interval.

Figure 2:
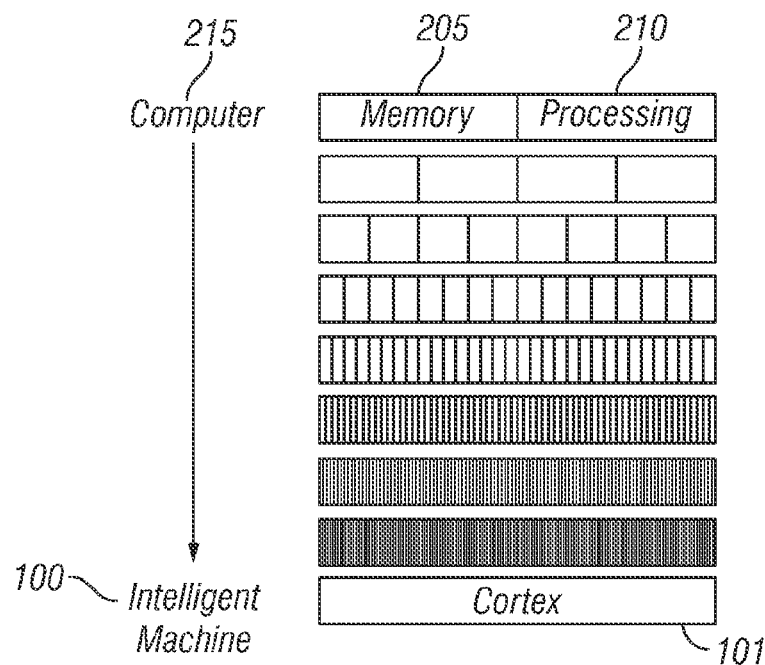
FIG. 2 illustrates a schematic diagram showing the comparison of a cortex of the intelligent machine with memory and CPU of a computer, in accordance with the disclosed embodiments.

FIG. 2 illustrates a schematic diagram showing the comparison of a cortex 101 of the intelligent machine 100 with memory 205 and CPU 210 of a computer 215, in accordance with the disclosed embodiments. Cortex 101 is a uniform collection of millions or billions of interacting units and it is solely responsible for the adaptive "intelligence" of the intelligent machine 100. It is scalable much as RAM in a traditional computer 215 is scalable. Cortical "memory" can actually be seen as a fine mesh of memory 205 and CPU 210. This mesh is so fine that the distinction between memory 205 and CPU 210 has been lost. Cortex 101 is adaptive hardware and can best be thought of an ecosystem or economy of interacting modules. Just as "money" is the substance that drives an economy, prediction is the currency of a cortex 101. Just as an economy is created out of the interactions of many individuals following some "societal rules", a cortex emerges out of the interactions of many independent modules following specific rules. Constructing a cortex 101 amounts to understanding these rules of interaction and providing a "substrate" that allows modules to interact.

Cortex 101 is decidedly "fractal". This means that a bunch of modules can be treated as one "meta module", and a larger cortex 101 can be constructed by allowing "meta modules" to interact. This pattern can be repeated until space, power or budget constraints are met.

Cortex 101 has lost the distinction between memory 205 and CPU 210, and this has profound consequences for how it functions and the types of problems it solves efficiently. In traditional computing, algorithms or programs are written by humans and given to a computer to run. The "architecture" of the computer 215 is really the structure of the program itself, and this structure is "imposed" on the computer. A program has a state, and depending on the state and the values of state variables, the program transits into another (or the same) state. A program is nothing but a list of these states and state transition rules. The act of writing a program is the act of creating an architecture. The cortex 101 evolves its architecture as needed to maximize its acquisition of free energy. It is therefore important to specifically avoid imposing any architecture on the cortex 101 because its job is to find or evolve architecture.

Figure 3:
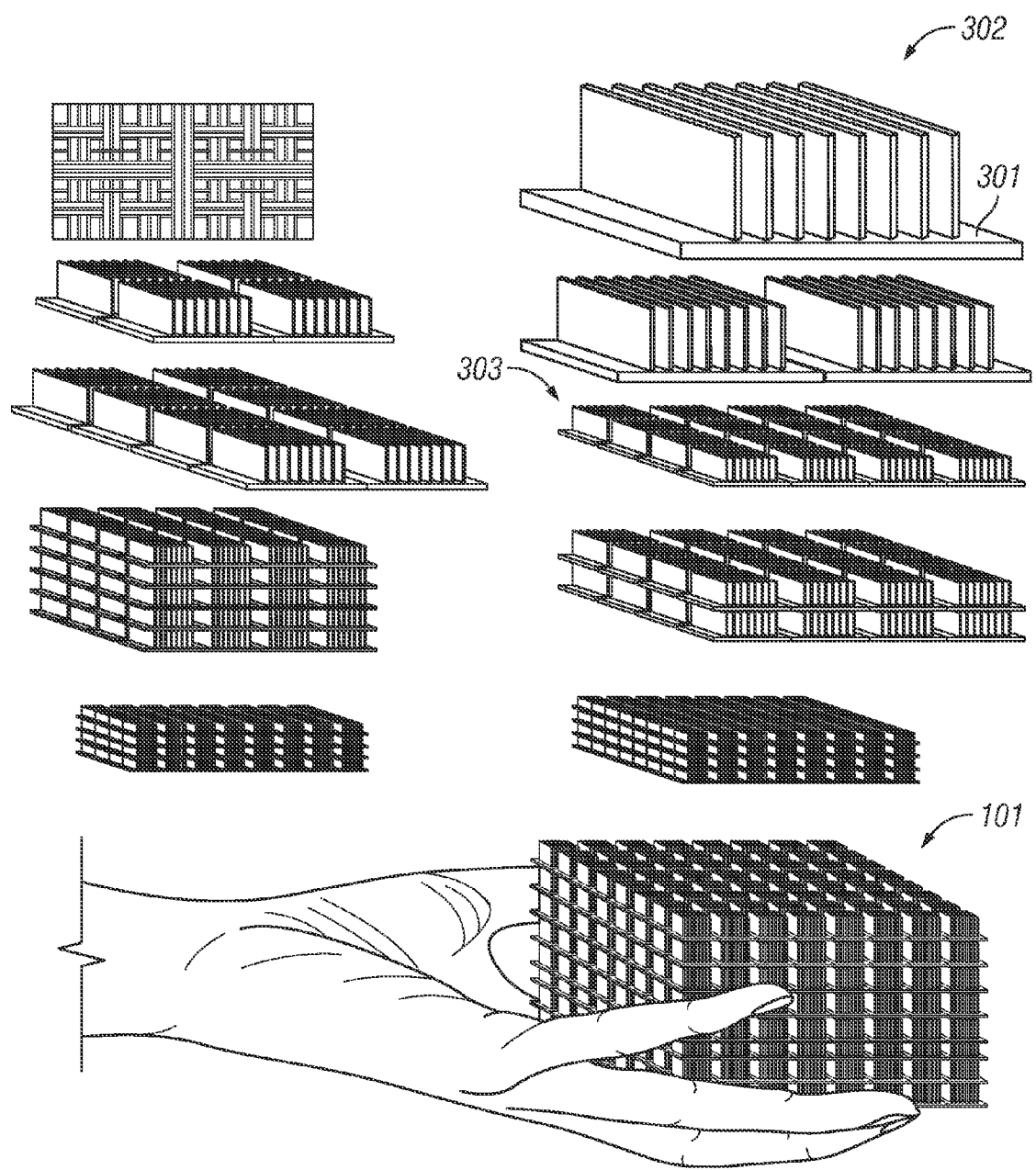
FIG. 3 illustrates a schematic diagram of the cortex comprising a fractal assemble of modules interacting through a substrate, in accordance with the disclosed embodiments.

FIG. 3 illustrates a schematic diagram of the cortex 101 comprising a fractal assembly of modules 303 interacting through a substrate 301, in accordance with the disclosed embodiments. A plasticity rule is a rule that determines how one module 302 in a group of interacting modules 303 should behave. At a fundamental level, a plasticity rule is a statement of physics, the underlying "rules of interaction", for example, gravity (mass interacting rules) and electromagnetism (charge interaction rules). Rules of interaction can exist at a much higher level than the "fundamental" rules of interaction in basic physics, and these rules can emerge from the interaction of components organizing due to the laws of physics. A biological neuron is of course a good example, as it has evolved rules of interaction that emerge from the physics of its constituent parts. A successful plasticity rule is able to evolve structure. The plasticity rule within a cortex 101 allows it to "derive" high-level structure, so long as the environment it is embedded in contains structure.

An intelligent machine 100 is a dissipative structure. This is to say, it derives its structure from the dissipation of free energy. For example, consider a mountain river. The water flows noisily around a twisting and falling path through piles of rock, fallen trees, and dirt. From this commotion patterns can be seen. When the water flows over the river-bed, local interaction (viscosity), combined with energy dissipation (the gravitational gradient) will create stable ripples and eddies that mirror the stable sub-surface structure (river bed). The structure of the riverbed cannot be seen, but it can be inferred by looking at the patterns that form on the surface. That is, the structure on the riverbed is represented in the structure of the water that flows around it.

As information is streamed into the cortex 101, it is broken down into its component parts and reassembled to form stable circuits. Any given structure that supports a number of stable states acts as a unit of computation known as a logic function. The logic that is needed to process a data stream is derived from the structure of the data stream. The cortex builds its own architecture only because the data that it is processing contains structure. A cortex will not function on noise.

Structure is the signature of free energy. If a structure can be predicted, then its energy can be extracted. An intelligent machine, like all dissipative systems, is an assembly of modules 302 that work together to convert the structure in the environment 130 into algorithms that acquire and dissipate free energy.

For a cortex 101 to function, the information contained in the sensors 120 must contain structure. This structure is everywhere and it is unavoidable. The modern digital code (zero or one) represents the finest grain of structure. Rather than a voltage occupying any value between zero and one, it may only be zero or one. This collapse of randomness creates the structure needed by the intelligent machine to configure itself. A more "natural" source of structure is revealed from the application of a plasticity rule acting on natural data streams. In vision, the based states correspond to "edges" and other simple features. These features are the "alphabet" of vision. Rather than simply using a binary code, cortex 101 uses the alphabet defined by the structure of the information it is processing.

Figure 4A:
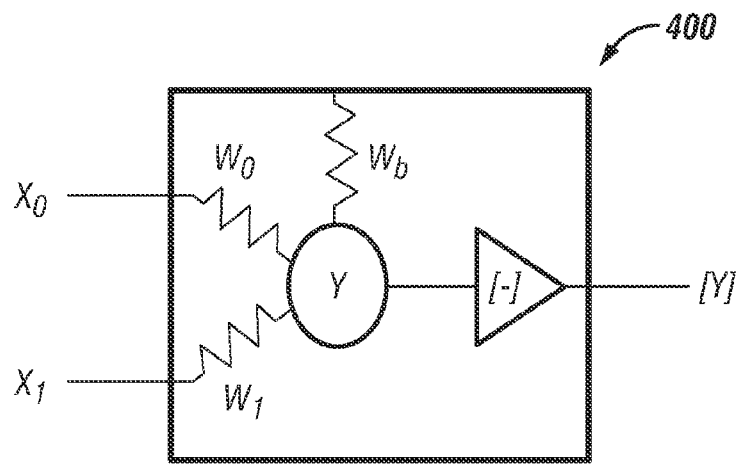
FIG. 4A illustrates a schematic diagram of a basic two variable system comprising three synaptic weights, in accordance with the disclosed embodiments.

FIG. 4A illustrates a schematic diagram of a basic two variable system 400 comprising three synaptic weights such as $w_0$, $w_1$, and $w_b$, in accordance with the disclosed embodiments. The two variable system 400 include two wires $x_0$ and $x_1$, and the voltage on these wires is changed over time. FIG. 4B and FIG. 4C illustrates the graphical representations of a two variable system of FIG. 4A, showing the distribution of the voltages over time, in accordance with the disclosed embodiments. The voltages on the two wires are measured and many measurements over time ultimately produce the data features in FIG. 4B. After some time, the process of measuring the voltage with respect to time is repeated and the graph in FIG. 4C is plotted. Note that the graph in FIG. 4B contains no structure whereas the graph in FIG. 4C contains structure. The data contains structure when a plasticity rule converges to two or more states when presented with the data. The problem with the distribution of the graph in FIG. 4B is that every point is equally likely. We may thus say that structure exists when the input data distribution contains low entropy.

Consider the two input system 400 composed of three synaptic weights such as $w_0$, $w_1$, and $w_b$. A node is the meeting house of synapses, the place where the synapses get together to share their information. As they do this, they are affected by the process via the plasticity rule. When the synapses get together, they first sum together to form an internal continuous variable Y, which is defined by an equation (1) below:

$$Y = w_0 x_0 + w_1 x_1 + w_b \quad (1)$$

Each inputs is multiplied by a synapse and summed together to form an output Y. $W_b$ is a "bias" synapse and is formed between the boundaries of the node. This can be understood as a synapse connected to an input that is always in one state. The output of the node is forced to take one of two states such as "+1" or "−1". This is accomplished with the bracket operator [Y], where [Y] is "1" if Y≥0 and "−1" if Y≤0. The bracket operator is nothing more than the positive feedback applied to an initial state. The closer to zero the initial state, the longer it will take for the amplification to reach its required threshold of "±1". It is at this step where the nodes internal supply of free energy is converted into structure.

Every time a synapse is used, it is modified by a plasticity rule. This modification can indicated in equation (2) as follows:

$$\Delta w_i = \alpha x_i Y e^{-\sigma Y^2} = \alpha x_i f(Y) \quad (2)$$

where $\Delta w_i$ is the modification to the $i^{th}$ synapse, $\alpha$ is the learning rate, $x_i$ is the $i^{th}$ input, and $\sigma$ is a constant. Notice that $f(Y)$ is an antisymmetric function, so that $f(Y)=-f(-Y)$. Now consider the stable states of this node. The stable states are dependent on the input data distribution. Stable states will exist if the input data contains structure and not otherwise. The two possible patterns $p_0$ and $p_1$ that can be written as shown below in equation (3) and (3.1) respectively are:

$$p_0 = [1,1]; \quad (3)$$

$$p_1 = [-1,-1] \quad (3.1)$$

Assume that the frequency of occurrence for these two patterns is equal. In this case, a stable point will exist if the total update to the weights over the whole distribution is zero. Y for the patterns $p_0$ and $p_1$ can be indicated in equation (4) and (5) respectively as follows:

$$Y(p_0) = w_0 + w_1 + w_b \quad (4)$$

$$Y(P_1) = -w_0 - w_1 + w_b \quad (5)$$

The total update to each weight over all presented patterns must be equal to zero as illustrated below in equation (6):

$$\Delta w_0 = \alpha f(Y(p_0)) - \alpha f(Y(p_1)) = 0 \quad (6)$$

which leads to the following equation (7):

$$f(Y(p_0)) = f(Y(p_1)) \quad (7)$$

Since f(Y) is anti-symmetric, equation (8) can only be satisfied if:

$$Y(p_0) = Y(p_1) \quad (8)$$

which leads to the constraint as indicated in equation (9) below:

$$w_b = 0 \quad (9)$$

Repeating this process for the following equation (10) as indicated below:

$$\Delta w_b = \alpha f(Y(p_0)) + \alpha f(Y(p_1)) = 0 \quad (10)$$

The constraint can be written as shown in equation (11):

$$w_0 = w_i \quad (11)$$

To visualize what this means, this state can be drawn along the side of the data distribution. To do this, the decision boundary that point where Y goes from positive to negative has to be found as illustrated below in equation (12):

$$Y = w_0 x_0 + w_1 x_1 + w_b = 0 \quad (12)$$

Solving equation (8) for $x_1$ and substituting conditions, the decision boundary can be arrived as shown in equation (13) below:

$$x_1 = -x_0 \quad (13)$$

Figure 5A:
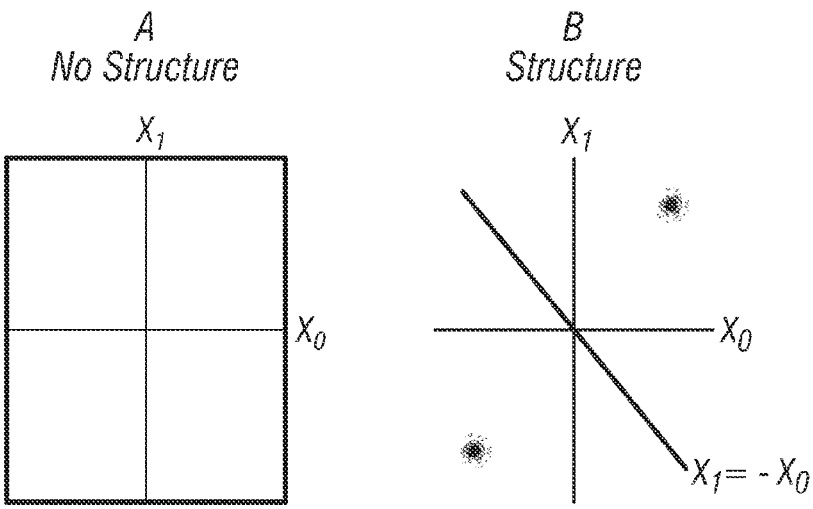
FIG. 5A illustrates a graphical representation of a two variable system of FIG. 4A showing the decision boundary for the stable point of the plasticity rule acting on the data distribution, in accordance with the disclosed embodiments.
Figure 5A:
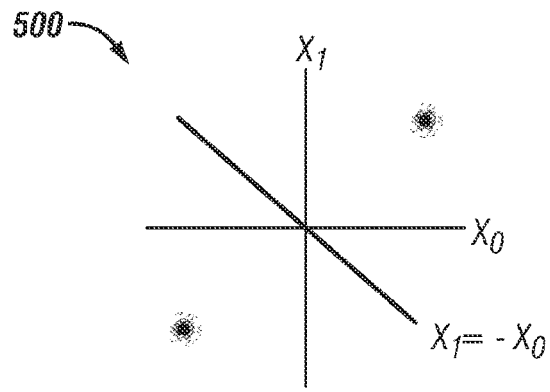

FIG. 5A illustrates a graphical representation 500 of a two variable system of FIG. 4A showing the decision boundary for the stable point of the plasticity rule acting on the data distribution, in accordance with the disclosed embodiments. The most important thing to realize here is that the decision boundary has "split" the data distribution in half. The constraints that are acting on the synapses allow for two configurations, since it is allowed that a synapse is negative. Every state has its anti-state. Thus, to properly represent a state visually, an arrow can be drawn. This arrow is a composite of a number of properties. Its direction is along its decision boundary, its magnitude is proportional to the magnitude of the synapse vector, and its arrow allows to distinguish state from anti-state.

Figure 5B:
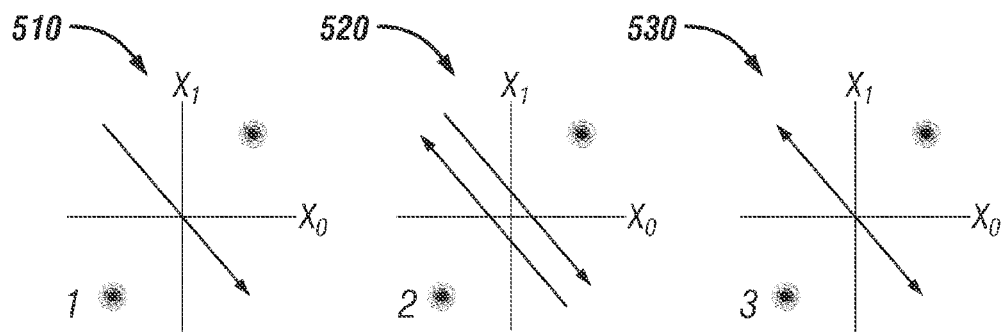
FIG. 5B illustrates a graphical representations of a two variable system of FIG. 4A representing the states of a plasticity rule, in accordance with the disclosed embodiments.

FIG. 5B illustrates the graphical representations 510, 520, and 530 of a two variable system of FIG. 4A representing the states of a plasticity rule, in accordance with the disclosed embodiments. The graphical representation 510 depicts one state of a plasticity rule and graphical representation 520 depicts the state and its anti-state. To simplify the diagram, a state and its anti-state is represented as a double-pointed arrow as indicated in the graphical representation 530. By using the "right hand rule", the sign of the state can be determined for a particular input.

Figure 6A:
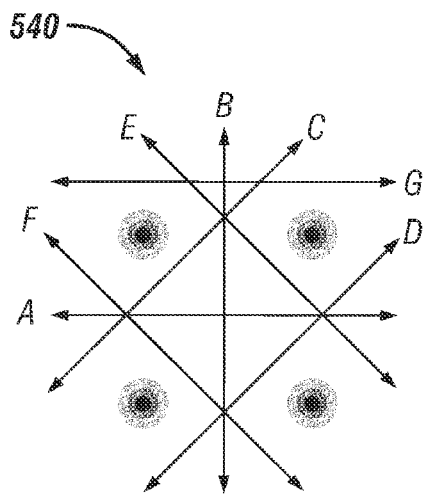
FIG. 6A illustrates a graphical representation of a two variable system of FIG. 4A representing fourteen possible states from "A" through "G" with anti-state, in accordance with the disclosed embodiments.

The input data distribution can be expanded to allow all possible binary input patterns. FIG. 6A illustrates a graphical representation 540 of a two variable system of FIG. 4A representing fourteen possible states from "A" through "G" with anti-state, in accordance with the disclosed embodiments. If all states bisect the data structure, 14 unique states such as A, B, C, D, E, F, and G, each with its anti-state can be arrived. Of particular interest here are states C, D, E, F, and G which cannot occur unless two properties hold. First, there must be a bias weight $w_b$. Second, f(Y) must approach zero as Y→±∞. The first property is somewhat obvious by looking at the decision boundary, which is not possible to draw without a bias. The second property is much more subtle, but very important.

Now consider that the synapse vector is in "E" state and the plasticity rule can be changed to the equation (14) as shown below:

$$\Delta w_i = \alpha x_i Y \quad (14)$$

Figure 6B:
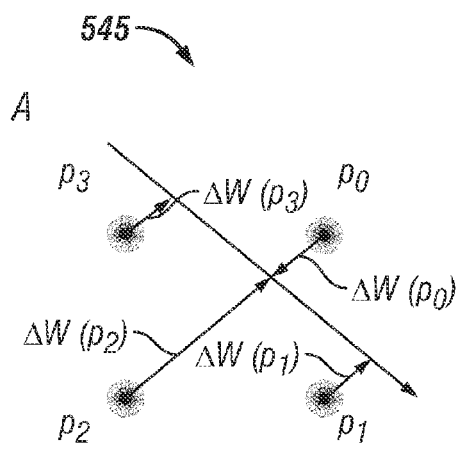
FIG. 6B illustrates a vector diagram of two variable system of FIG. 4A showing three vectors, each representing the weight update for each feature, in accordance with the disclosed embodiments.
Figure 6C:
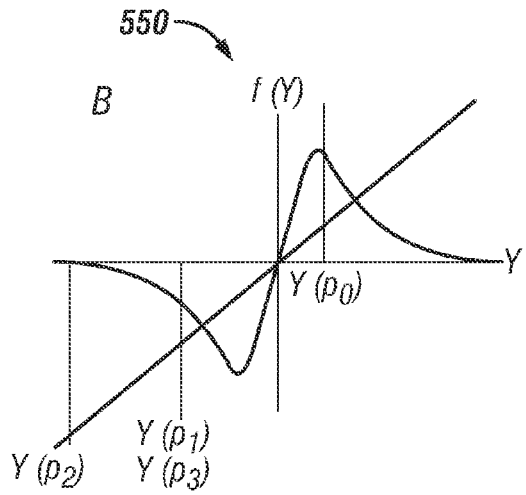
FIG. 6C illustrates a graph representing the distribution of anti-symmetric function with respect to output of two variable system of FIG. 4A, in accordance with the disclosed embodiments.

FIG. 6B illustrates a vector representation 545 of a two variable system of FIG. 4A showing three vectors, each representing the weight update for each feature, in accordance with the disclosed embodiments. FIG. 6C illustrates a graph 550 representing the distribution of anti-symmetric function with respect to output of two variable system of FIG. 4A, in accordance with the disclosed embodiments.

Assuming that each feature of the data distribution occurs with equal frequency, if a sense for how the weight is modified for each feature is got, stability can be checked if the total is zero. If the total is zero, then the state is stable. The graph 545 shows three vectors each representing the weight update for each feature. Both plasticity rules in equation (2) and equation (14) modify the weight in a direction that is parallel or anti-parallel of the feature. The anti-symmetric nature of the rules insures that the synapses will be moved in the direction that will push the decision boundary away from the feature. This is simply positive feedback acting on a synapse with a state. A stable point exists when features on either side of the decision boundary push against each other with equal and opposite magnitudes. The average weight updates must balance each other, or the state is not stable.

The update must approach zero as |Y| gets large. If the state is "imbalanced", such that the decision boundary splits the features into unequal sets, a linear rule such as equation (14) cannot handle the imbalance. From the graphical representation 545, it is clear that the update from $p_1$, $p_2$, and $p_3$ completely overwhelms the update from $p_0$. However, if the rule is non-linear and of the form of equation (2), then the update from $p_2$ effectively goes to zero, and a slight offset of the decision boundary results in the $p_0$ update, balancing the combined updates from $p_1$ and $p_3$.

Figures 7, 8:
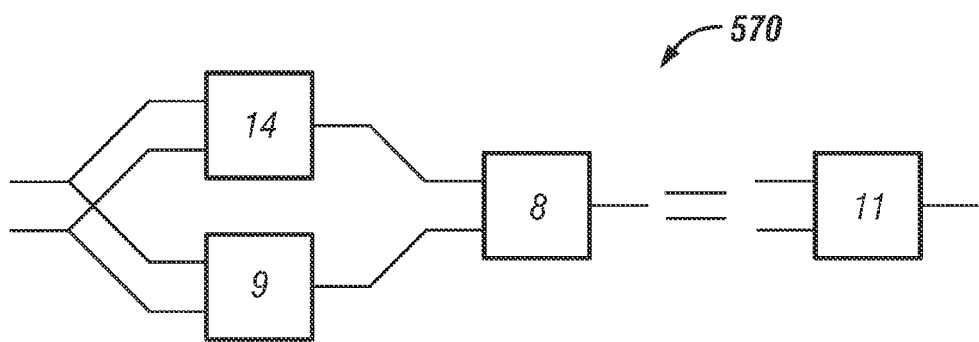
FIG. 7 illustrates a table of a two input one output gate showing the logic function corresponding to each plastic state, in accordance with the disclosed embodiments.
FIG. 8 illustrates a schematic diagram of a two input one output gate showing logic functions cascaded to form new logic functions, in accordance with the disclosed embodiments.

FIG. 7 illustrates a table 560 showing a set of all logic gates corresponding to each plastic state for a two input one output gate, in accordance with the disclosed embodiments. Note that the "node" described here can also be considered as a logic gate. Given two binary inputs and one output, sixteen possible logic gates exists. To avoid confusion, the standard "1/0" notation will be changed to "+1/−1", or more simple yet, "+/−". Each plastic state corresponds to one logic function. For example, state "D" corresponds to logic function "5". The logic function "6" and "11" which are better known as the "XOR" gates, do not have a corresponding plastic state. Although it is unfortunate that this node cannot occupy every possible logic state, it is not required. Fortunately, it is possible to derive all logic function from a smaller set of logic functions which can be accessed through plastic states.

FIG. 8 illustrates a schematic diagram of a two input one output gate 570 showing logic functions cascaded to form new logic functions, in accordance with the disclosed embodiments. The ability to form all logic function by cascading a smaller set of logic function means that the set is computationally complete. In fact, the NAND logic "9" alone computationally complete. The plastic states "A", "~A", "B", "~B" are not computationally complete. There is simply no way to derive all of the other logic functions (those pesky XOR's) with them, because to do this, a logic function that was selective to only one feature is needed, and this would require it be imbalanced.

Although it is now apparent that the plastic states are computationally complete, there is nevertheless a very important detail that must be explored. Note that in FIG. 8, the gates were referenced to their logic functions, not the plastic state. In FIG. 7, it is "clear" that logic function "14" is plastic state "~F", logic function "9" is plastic state "~E", and logic function "8" is "E". In fact, this is not always true. The reason is that plastic states are only defined by the structure of the information that they process. Since the logic functions collapse this structure, a node that receives input from other nodes may not actually see the same structure that the upstream nodes see. This property has profound implications in an evolutionary system. If the plastic states are computationally complete, but not all logic states are explored, this means the system only searches a sub-space of possible logic functions.

Figure 9A:
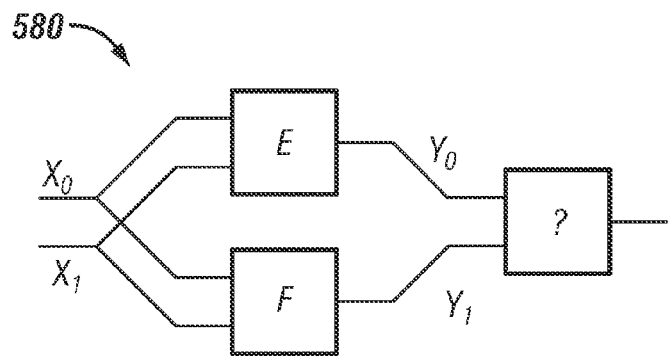
FIG. 9A illustrates a schematic diagram of a cascaded circuit, in accordance with the disclosed embodiments.

FIG. 9A illustrates a schematic diagram of a cascaded circuit 580, in accordance with the disclosed embodiments. The output of nodes E and F are input to a second-layer node. FIG. 9B illustrates a graphical representation showing the input data distribution 590 of cascaded circuit of FIG. 9A, in accordance with the disclosed embodiments. The input distribution is the full set, that is, all possible binary two input patterns. The input distribution is given by the following set (15):

$$[x_0, x_1]: [+,+][+,-][-,-][-,+] \quad (15)$$

FIG. 9C illustrates a graphical representation showing the output data distribution 595 of cascaded circuit of FIG. 9A, in accordance with the disclosed embodiments. If the outputs of the E and F nodes are taken and used as the inputs to another node, it is noticed that the asymmetric nature of the plastic states "E" and "F" has caused structure to "merge". The output distribution is given by the following set (16):

$$[y_0, y_1][+,+][+,-][-,+] \quad (16)$$

The output distribution $[y_0, y_1]$: $[-1, -1]$ is missed and $[y_0, y_1]$: $[1, 1]$ occurs with twice the frequency as the others.

Figure 10:
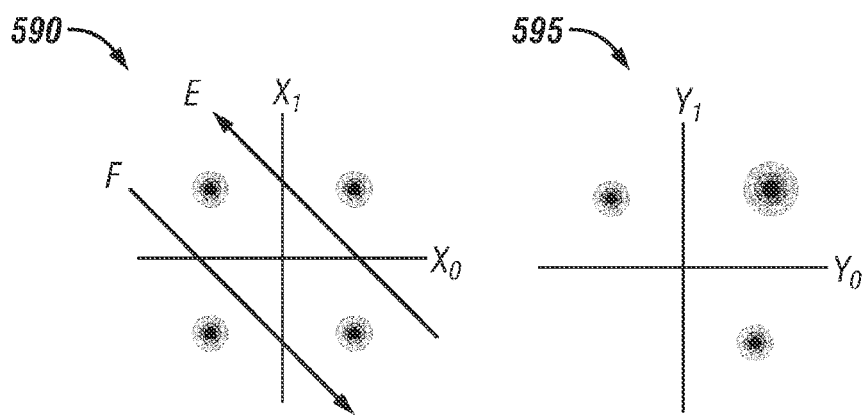
FIG. 10 illustrates graphical representations showing the output data distribution of cascaded circuit with collapsed data structure, in accordance with the disclosed embodiments.
Figure 10:
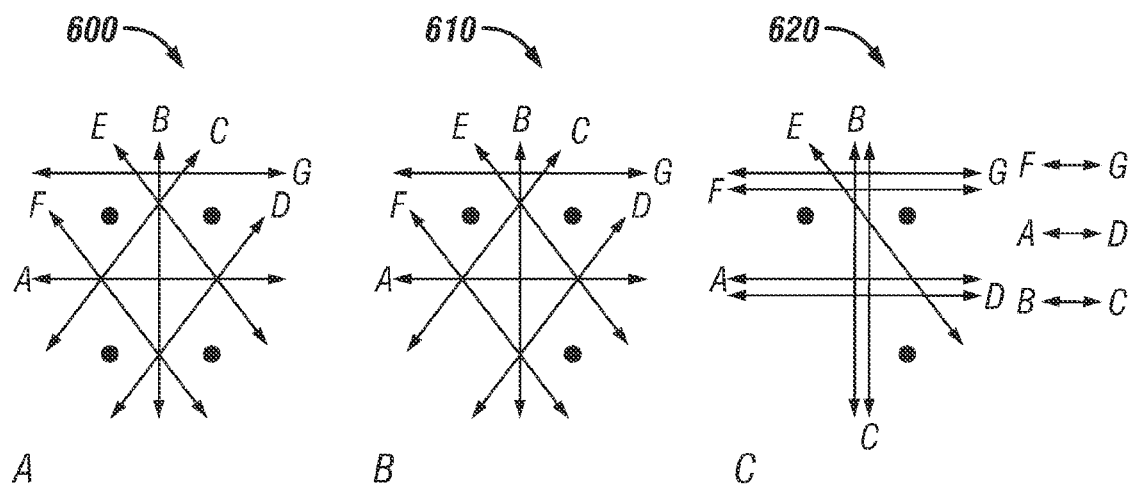

FIG. 10 illustrates the graphical representations showing the output data distributions 600, 610, and 620 of the cascaded circuit of FIG. 9A with collapsed data structure, in accordance with the disclosed embodiments. From the output distribution 610, it is clear that the structure is lost. When the data structure collapses, as shown in output distribution 620, the state "F" becomes state "G", "A" becomes "D", and "B" becomes "C". Fourteen states are possible at the input, only eight states are possible at the output. Given the output distribution $[y_0, y_1]$, the states that are no longer allowed represent redundant logic functions.

The collapse of data structure is incredibly valuable and represents one of nature's hidden secrets. However, this is only true within the context of an evolutionary system. An evolutionary system must find answers from a very large set of possibilities. This is in stark contrast to a computer, which simply does exactly what it is told to do. The human programs the computer and the computer runs the program. The space of all possible logic functions is incredibly large and searching through this vast space for a solution is difficult, particularly if one has to check every possible configuration. However, the intelligent machine does not waste energy checking redundant configurations, because only those logic functions that are supported by the data structure are allowed, while redundant functions merge together. This has the affect of vastly reducing the energy required to search the configuration space.

Figure 11:
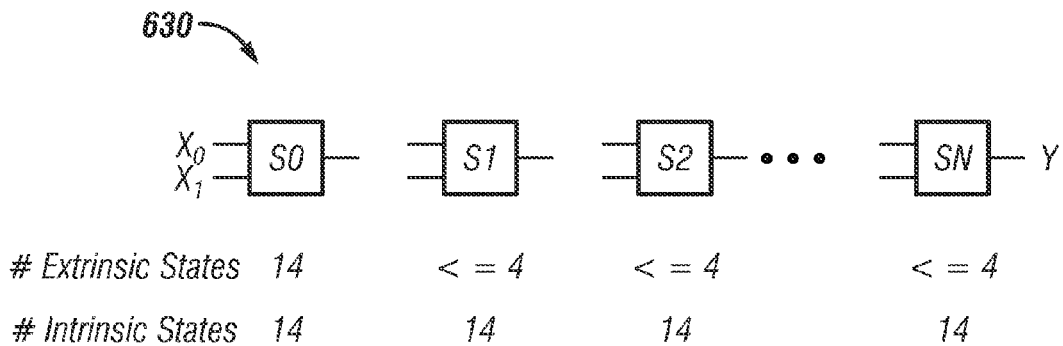
FIG. 11 illustrates a schematic diagram showing the number of allowed states for an intrinsic node and extrinsic node, for two input one output logic function configuration, in accordance with the disclosed embodiments.

FIG. 11 illustrates a schematic diagram 630 showing the number of allowed states for an intrinsic node and extrinsic node, for a two input one output logic function configuration, in accordance with the disclosed embodiments. Three nodes have been cascaded together to form a larger circuit capable of any possible two input one output logic function. The circuit can be imagined in two ways. First, the states "A" through 'G" are intrinsic to the node and not a function of the data structure. This is, in fact, how electronic gate arrays currently work. Since there are three nodes and each could be in fourteen states, that is a total of $14^3 = 2744$ configurations of the circuit are possible. In the second case, the states are defined by the structure of the data and only 1347 possible configurations exist. It should be remembered that in both cases, any possible logic function can be attained. However, in the plastic case, only half the number of states need to be "searched" to find the right one. This effect becomes incredibly powerful as the depth of the circuit is increased.

When the logic states are defined by their data structures, it is called "extrinsic". That is, the logic is defined outside of the node by the structure of the information being processed. If the available logic functions are define by the node itself, it is called the "intrinsic" case.

The circuit 630 simply takes the output of the previous gate and duplicates this for the inputs to the next gate. Thus, no matter what the state of the first node (S0), the inputs to all other nodes will consist of at maximum two patterns and four states. Thus, when the depth increases, the total number of states in the intrinsic case grows as illustrated below in equation (17):

$$N_i = 14^d \quad (17)$$

where d is the circuit depth. For the extrinsic case, in the worst case scenario, the number of states grows as indicated in equation (18) below:

$$N_e = 14(4^{(d-1)}) \quad (18)$$

Figure 12:
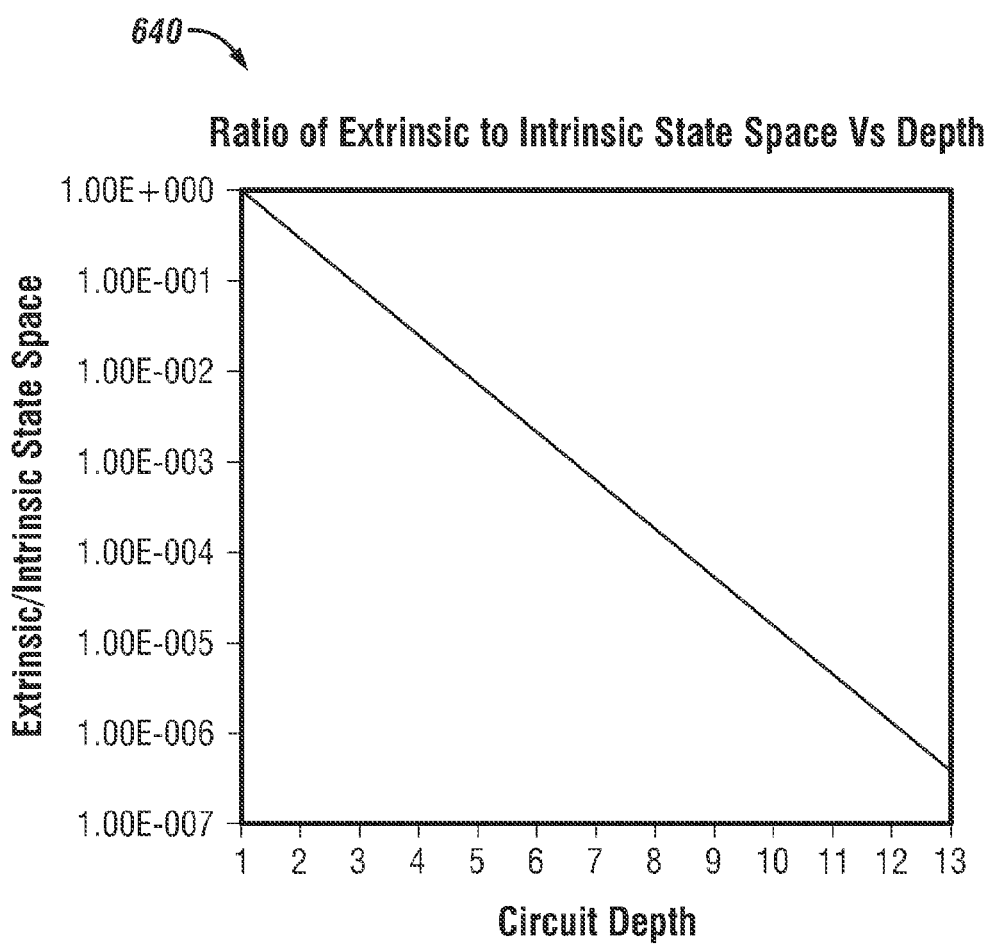
FIG. 12 illustrates a graph showing the distribution of ratio of extrinsic to intrinsic state space against depth, in accordance with the disclosed embodiments.

FIG. 12 illustrates a graph 640 showing the ratio of extrinsic to intrinsic state space against depth, in accordance with the disclosed embodiments. As the depth becomes large, the difference between the two "search spaces" grows exponentially. For a depth of twelve, the extrinsic state space is one million times smaller than the intrinsic case. An extrinsic evolutionary system can evolve with exponentially less energy than an intrinsic evolutionary system because it does not waste energy transitioning into redundant states. Before discussing how exactly circuits can be evolved, a key principle that will strongly affect the types of circuits that can be evolved from an extrinsic system has to be elucidated.

Modern computing has revolutionized the world. This has occurred because billions of people have realized that a computer is capable of doing the most mundane things over and over again with no errors. It is simply impossible for a human to do what a computer can do, and that's basically the point. Programs have no concept of work or energy, and will simply run at full throttle no matter what the program is. A program never figures out how to "kill two bird with one stone". Nature, on the other hand, evolves highly integrated solutions to problems. Structures almost never serve just one purpose, but rather interact with a number of other structures to solve a number of problems at the same time. There is a reason for this, and it's a consequence of an extrinsically stabilized system.

Figure 13:
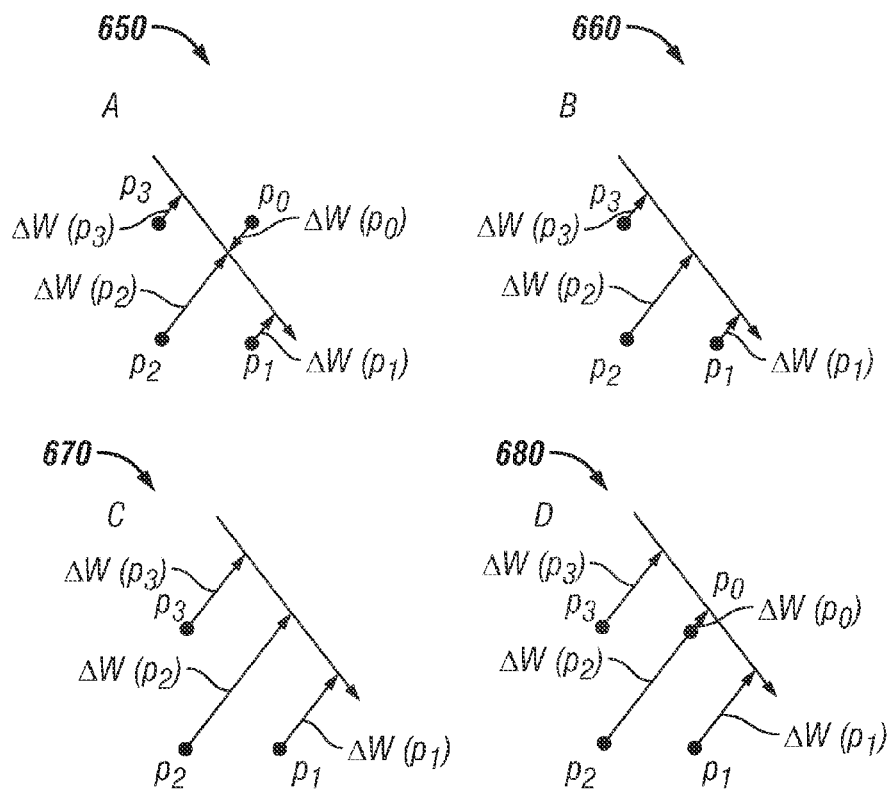
FIG. 13 illustrates vector representations showing the stability of symmetrical and asymmetrical states of a two variable system, in accordance with the disclosed embodiments.

FIG. 13 illustrates vector representations 650, 660, 670, and 680 showing the stability of symmetrical and asymmetrical states of a two variable system representing the states of a plasticity rule, in accordance with the disclosed embodiments. Asymmetrical states are less stable than symmetrical states. If a pattern does not occur with a sufficient frequency, states can be lost. For this reason, all computations must be pinned to a constantly occurring base structure.

Flow is the mechanism that allows individuals to come together toward one unified goal. It is, quite literally, the force that binds the units together. To understand the concept of flow, the economic structure can be considered. The thing that binds people together into large companies is money. If a company fails to pay its employees, the employees would join another company. A person who does not spend money has no need for money, which leads to a refinement. The thing that binds individuals together in a company is the flow of money through them. As more money is exchanged this means more energy is being dissipated. The key concept of flow is the part that binds it to the plasticity rule and creates an intelligent system. The concept of flow is very simple. The cortex functions just as the "economy" functions. Small systems come into being and either dies or is amplified to a scale that can be supported by the intelligent interaction with its environment. Each nodes within the cortical ecosystem competes for flow. Those with flow are stabilized while those without flow start to mutate their function.

The cortex does not stabilize directly with energy flow, but rather a measure of it. It does not matter what is flowing, so long as every node in the system agrees on the function of the substance. Money is only valuable because it is believed by all that it is valuable. Money cannot be eaten or used for shelter. It has no practical use, except that it is a good measure of energy. An assembly is only possible if all units in the assembly believe in a shared concept of energy, whatever that is. If the concept does not turn out to be an adequate representation of energy, the system will not stabilize and it will die after time, with no exception.

The origin of energy is prediction. If node "A" connects to node "B" (A→B), then "A" receives flow when "A" succeeds in activating "B" within a causal time window. Free energy can only be reliably accessed if it is predicted. Consider an example, where an intelligent machine sees sugar, runs to it, and eats it. A predication is not one thing or even one moment, but rather whole sequence of space time configurations that end in the acquisition of free energy, in this case the sugar.

The prediction starts with sensor feature detectors. Perhaps this is the visual pattern of a cookie jar configuration, the detection of these features cause a cascade of neural activations within the cortex. Some of the neurons that are activated are motor neurons, which cause the intelligent machine to move toward the sugar. When the intelligent machine gets to (and eats) the sugar, free energy is detected by the RIOS, causing a flood of reward input the brain. The reason the reward input is of significance is simply because it is massively projected into the cortex. Reward is just an amplified signal, and like all signals, it can be predicted. A neuron that succeeds in predicting a reward signal is virtually assured of temporary stabilization because almost every neuron is connected to a reward neuron. However, a neuron that acts within a motor pathway that causes the activation of reward is virtually assured permanent stabilization because the pathway manifests its own stabilization. That is, moving a body across the room to acquire sugar is a self-fulfilling prediction that sugar will be attained.

Only those neurons that activated just prior to the reward will receive energy. This will include the last neuron to fire in the chain of neurons that actually moved the intelligent machine across the room. Since all the neurons that resulted in the successful prediction of energy form a causal chain, they all become bound by flow. If a neural pathway succeeds in acquiring free energy, it will be stabilized. The cortex evolves circuits to predict reward because this leads to higher dissipation of energy. Like life in general, a brain is nothing more than a positive feedback system fighting to preserve itself by dissipating free energy.

The cortex is not a static arrangement of connections. The cortex is an environment for growing connections. Growth requires flow and maintaining a configuration requires flow. The analogy here is clear. A house with three-car garage, a pool, hot tub, etc., requires more money each month to maintain than a house without these structures. If the money is lost, then it is no longer possible to maintain the structure. The result is that a pruning process occurs; where those items that cause the greatest leakage of flow (monthly expenditures) are pruned first. On the other hand, the arrival of additional monthly income cause additional structures to be erected until such a time as the money required to maintain the structure is equal to the money received. The last structures to go are the structures that actually make money.

A cortical neuron exists for only one purpose: to grow projections into the greater network. Growth requires flow. The more projections a neuron attains, the more flow is needed to sustain it. That is, its metabolic costs increase. As defined in equation (19) below, the total energy available for growth is simply what is left after metabolic expenditures have been taken into accounts:

$$e_{growth} = \int e_{input}(t) - e_{metabolic}(t) dt \qquad (19)$$

where $e_{growth}$ represents growth energy, e input represents input energy and $e_{metabolic}$ represents metabolic energy. If $e_{growth}$ is positive, then the neuron is in a projective phase. The excess energy is used in the development of new structure. Specifically, it is used to grow new connections. If $e_{growth}$ is negative, then the neurons structure cannot support itself. Connections that produce the least amount of flow are pruned to lower the metabolic costs of the neuron until $e_{growth}$ once again becomes positive. This pruning phase is called the receptive phase.

During the receptive phase, the neuron is "listening and interested" in new signals from neurons. During this phase it emits a tracer that guides other neurons to it. However, lacking a source of flow, it can only really sit there and wait for another neuron to connect to it. Once other neurons connect to it, it now has new information and, via a plasticity rule such as STDP, it temporarily locks onto one plastic state. At this point, two things can happen.

First, the neuron may project to a sea of other neurons that are also in the receptive state. If the neuron succeeds in recruiting enough neurons in the receptive state, the neuron will achieve a high flow. However, there must be sufficient receptive neurons to continually recruit, because, without flow, the connections are highly unstable. No sooner will a connection be formed then another one is broken. However, if the rate of connection formation is equal to the rate of connection breakage, the result is high flow. This state of high flow manifesting itself from essentially randomness is only possible in large populations of neurons in the receptive state.

Second, the receptive neuron can find a stable source of flow. The only stable source of flow is derived from the predictable structure in the environment. If this occurs, the neuron is assured stability so long as the environmental structure is stable. Once flow has been attained in sufficient quantity to exceed the neurons metabolic cost, it enters the projective phase. A projective neuron is no longer interested in new signals. Rather, it has found a function and it now attempts to project the output of this function as far and wide as it possibly can. It will only stop projecting when its metabolic costs reach such a high level that they cannot be supported by its flow intake. Exactly how far and wide the neuron can project to depends on what it is predicting. There are three basic types of stable predictions: (1) sensory predictions, (2) proprioceptive predictions, and (3) reward predictions.

Sensory predictions occurs when a neuron or collective of neurons finds a configuration that can take as input sensory data and generates as outputs predictions of sensory data. For example, suppose that an environment contains a constant background signal that repeats over and over again. If a neuron has found a way to predict this stimulus, it will be stable. In a visual world composed of moving edges, for example, circuits could evolve that predict the location of an edge over time. In proprioceptive predictions, if a neuron forms a part of the circuit that connects to a motor neuron that causes a movement and in turns predicts the proprioceptive sensor activations form this movement, this is a very reliable source of flow. This is how the intelligent machine gets to know its own body. Irrespective of a chaotic environment, a stable structure emerges from the restricted kinetics of the intelligent machine's body. The reward prediction is the jackpot, the mother of all predictions. Since the same reward signals are broadcasted all over the cortex, a neuron that can predict reward can grow all over the cortex, using each reward neuron as a new source of flow to further sustain its growth and ultimately coming to control or direct the growth of all nodes in the cortex.

A neuron that has found a reliable mechanism to predict reward will eventually come to dominate the cortex. This is how an intelligent machine become an expert at something, through the evolution of a circuit that comes to dominate all other circuits via its ability to predict reward. Of course, the prediction of reward is the quintessential self-fulfilling prophesy. The only way to get reward is to move the body into a configuration that achieves the reward. There can be many ways to do this, and this is the process of becoming an "expert" or "specialist". A specialist occurs when one circuit comes to dominate all the reward neurons, while a generalist maintains many circuits that more equally consume the reward predictions.

To conclude, a neuron possesses receptive and projective states which are determined by the net difference between the total energy it receives and the energy that is required for metabolic maintenance. The energy states are generally given by the following equations (20) and (21) below:

$$\text{Projective: } e_{growth} > 0 \quad (20)$$

$$\text{Receptive: } e_{growth} \leq 0 \quad (21)$$

Figure 14A:
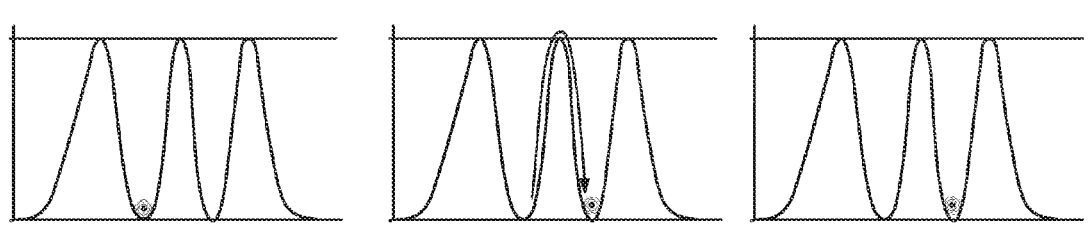
FIG. 14A illustrates a graph showing the potential energy expenditure of intrinsic system during a configuration change, in accordance with the disclosed embodiments.
Figure 14B:
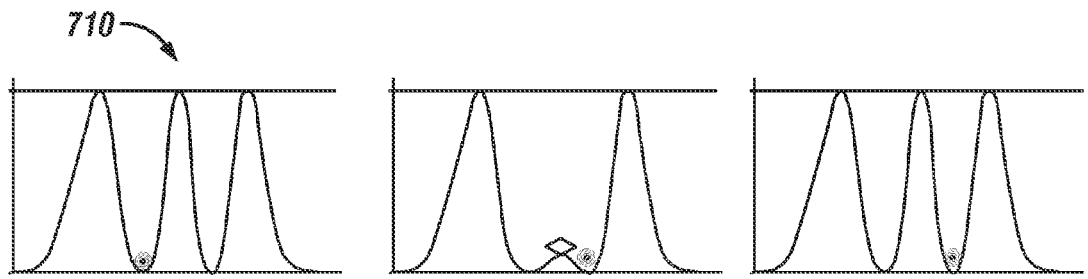
FIG. 14B illustrates a graph showing the potential energy expenditure of extrinsic system during a configuration change, in accordance with the disclosed embodiments.

FIG. 14A illustrates a graph 700 showing the potential energy profile of a configuration change of an intrinsic system, in accordance with the disclosed embodiments. Both intrinsic and extrinsic systems contain states that govern their function. The potential energy barriers between these states are high to prevent random thermal fluctuations from causing aberrant state transitions. In the intrinsic systems, these energy barriers are fixed and are a result of the structure of the device, for example, RAM, Flash memory, Magnetic memory, etc. Configuring the intrinsic device is equivalent to writing data into a memory.

For example, for a program to be run, the memory that encodes the program must first be transferred into RAM. When the data for this new program over-writes the data for the old program, energy is dissipated. That is, energy is dissipated when information is erased. Thus, the process of configuring memory costs significant energy because it is essentially erasure. Evolving algorithms requires vast numbers of state transitions.

Consequently, if algorithms are evolved with intrinsic systems, they will expand enormous amounts of energy as they constantly erase previous configurations Extrinsic systems, on the other-hand, expand zero energy on reconfiguration. This is a surprising statement, but it is true. Extrinsic systems expend energy repairing useful states, but do not actually waste energy in the configuration. The "plastic states" are a function of the structure of the information that is being processed. The logic function is defined by the plastic state, but the plastic state only emerges when the plasticity rule acts on the information.

The plasticity rule requires energy to build the synapse structure and this energy must be attained from predictions. This can be visualized as an energy potential that grows around the state, not the state transitioning into a new configuration. Rather than expending energy on a state transition and moving the state up and over the potential energy barrier, an intrinsic system simply stops providing positive feedback. The potential energy barriers falls until thermal noise provides the energy for a state transition. If the transition happens to be a good one, feedback will once again resume and the energy barriers will be erected, trapping the state.

The energy taken to erect the energy barrier is equal to the energy taken to overcome the barrier, so that the intrinsic and extrinsic cases consume the same amount of energy. While the energy barrier is low, the extrinsic system can perform thousands to millions of transitions, each powered by thermal fluctuations. The extrinsic system expends as much on the whole evolutionary process as the intrinsic system spends simply transitioning once.

An amazing property of an extrinsic system is that it only expends energy maintaining rigid structure. A computer is nothing like this. A computer will operate at full power to solve a problem so long as it is not waiting for some external input. A computer has no concept of energy, and this in fact is what makes a computer stupid and incapable of being intelligent.

For a cortex to efficiently find algorithms, it must possess a sufficient base connectivity that allows any neuron to find and connect with any other neuron within a few numbers of steps. This architecture is mostly likely of the small-world type, where connections are dominated by local connections with a few long-range connections. Such architecture insures that connectivity to global network is still high while keeping as much computation as possible local.

Competition is very important. In economics, competition encourages innovation. The reason for this is that a competitive process has a winner and a looser. The winner goes on to occupy the projective phase and becomes solely directed to stabilizing its acquired structure. The looser enters the receptive phase and, as a result, is exposed to new ideas and possibilities by accessing the primordial noise. These new ideas eventually manifest themselves if they acquire feedback, which is likely (but not guaranteed) to occur if they are better than the competition. Competition insures that only the winner receives flow. One way to accomplish this is with local inhibition. If a neuron fires, it activates an inhibitory neuron, which in turn represses the firing of any other neurons within the local area.

The cortex evolves algorithms. This is a messy process and the result, although functional, can be quite inefficient. A circuit may be evolved that is highly complex and consumes a great deal of resources, both time and energy. Cortex is not the best place to store a stable algorithm. Again consider an analogy to economics. A university or research lab or garage may be an ideal place to incubate products, but it is not the best place to bring it up to full scale production. Rather, a new and more efficient structure must be built for the sole purpose of production. It is the same with the intelligent machine. This structure is called the cerebellum and it exists for no other reason than to steal flow from the cortex.

The only output of an intelligent machine is through its motors. The cerebellum spies on the cortex and attempts to find reliable precursors to algorithmic activations, when it finds this, it is able to generate a signal that predicts the cortical signal. When this happens, the cerebellum shifts the timing phase of the motor outputs so they occur before the cortical signal arrives. Once this happens, all cortical neurons whose job was to carry out the algorithm loose their source of flow. As a result, they all enter the receptive phase and "go looking for work", ready to become part of the next great cortical innovation.

The connection to economics is interesting. Consider, for example, China is the cerebellum and United Sates (US) is the cortex. Whereas US perpetuate a rags-to-riches dream and idealize the individual, Asian cultures regard individualism as a source of punishment. To not be with the group is a living hell. What is happening now is that the US innovates new products and China has found a way to manufacture these products efficiently. This is of course a loose analogy, but accurate to some extent.

There is another analogy that is perhaps more powerful and direct. The cortex evolves programs and computers run them. The cerebellum works because it has spies within the cortex, reporting on its activity and using this to find the first reliable precursor to an algorithmic routine. Because of the extreme stability and repetition of body movements, the cerebellum has come to mostly automate the algorithms of body movement. The computer is to our cortex just as the cerebellum is to our cortex. Cortex figures out how to program a computer. In the process, the programmer steals flow (money) from other people, since he can now accomplish the same work more efficiently than his competitors. This same "innovation, copy, refine" pattern is repeated on many levels, from brains to social interactions to economies. A brain without a cerebellum is a highly impaired brain because it must consume all its resources on the foundational tasks such as simply moving the body.

When a motor neuron activates muscle fiber, that fiber flexes. The result of a motor output can be called as a flex. Although intuitively, the cerebellum generates reflexes, they can be more accurately thought of as a "preflex". That is, the cerebellum generates the 'prediction' of a reflex. It should be remembered that it was the cerebellum's ability to predict the motor movement that enabled it to steal the cortical flow. The cerebellum generates preflexes. Many preflexes join together to form the final algorithm.

Learning an algorithm is time consuming. Bodies necessarily contain huge degrees of freedom. Simply learning to pick up an object and move it to your mouth is an incredibly complex procedure filled with many sub-routines, each in turn composed of may flexes. Fortunately, it is possible to jump-start this process with reflexes. A reflex, like reward, is the result of a genetic circuit. It exists simply to bootstrap the cortex and give it some hints.

Consider a robotic arm intended to pick up objects. First the arm must navigate the (open) hand to an object, closing the hand around the object, and moving the (dosed) hand to another position. It would take an extremely long time to acquire this movement sequence outside of incredibly fine-grained reward signals. Reflexes available to the human infant at birth act to vastly speed up this task. In case of Tonic Neck Reflex, the baby placed on back, for example, assume a fencer's pose, the baby would outstretch the arm and leg in the direction he/she is facing and curl the opposite arm and leg inward. In case of Palmer Grasp Reflex, tickling the baby hand will cause hand to clench hard. Also, in Rooting Reflex, an object placed in an infant's hand will result in the hand grasping (Palmer grasp), followed by a movement to the mouth, regardless of initial hand position.

First, the Tonic Neck Reflex initiates an extend arm. Second, the Palmer Grasp will cause the hand to close around an object felt on the palm. Third, the Rooting Reflex will cause the object in hand to move to the mouth. Thus, by the addition of only three reflexes, the rate that a brain can learn to use its body to attain reward (sugar, for example) can be vastly increased. The function of the cortex in this case actually becomes learning to predict and then inhibit reflexes. In the process of learning to predict the reflexes, it essentially becomes the reflex. However, since the reflex can only be activated under certain stimulus conditions, the cortex has the freedom to apply the learn reflex in other situations. Thus, the best reflexes to endow a brain with are those base movements that will come to be part of many other movements, and the best environmental triggers will be ones that occur predictably.

A social reward has evolved for the accelerated evolution of cortical circuits. It is the sole function of the cortex to evolve circuits that can predict reward, and in a complex environment this is incredibly difficult. If one brain evolved a circuit to predict reward, mechanisms should be in place to accelerate the evolution of circuits within other brains. This mechanism is a social reward. Like free-energy reward signals, it is amplified. A social reward queues in on simple social patterns, for example, a smile (just an upward arc) or vocal intonation. Once activated, it serves the function of reward to the extent that it is actually correlated with the reward.

A mother's smile is heavily correlated with reward. A baby looking at a mother has a strong chance of drinking milk at the same time, or shortly thereafter. Thus, circuits that can learn to predict this visual queue are reinforced because they are important. It should be noted that a smile may not mean reward is coming, but quite the opposite. Consider the case of an "enemy" who smiles at your demise. The smile, although important, does not mean reward is coming. Quite the opposite, it means that reward is most certainly not coming. However, in both cases, a smile is important and any circuit that can predict it is important. A social reward is extremely powerful, but only if a corresponding reward reflex exists.

A reward reflex is genetically evolved circuit that activates motors during the detection of reward. The resulting flex generates a pattern that is detected via social reward. As an example, eating sugar causes a child's brain to detect reward, which causes the activation of facial muscles and results in a smile flex. The smile flex produces a visual pattern that is detected by a social reward in another brain. Any circuit within the brain that has predicted the social reward receives flow and is amplified. As an example, "brain 0" has just taken a bite of ice cream. Its free-energy reward system is activated as well as its reward reflex to smile. A circuit within the "brain 1" activates from the detection of the ice-cream cone at the same time a social reward is generated from the detection of "brain 0" smiling. Thus, the ice-cream-cone-detecting circuit receives flow and is stabilized. It is now much more likely that "brain 0" will evolve circuits involving ice cream cones.

A brain is simply an environment for the development and production of algorithms. The brain uses the structure of the world and thermal noise to evolve its own internal structure for the sole purpose of extracting free energy. Detecting free energy is the act of dissipating it. To dissipate free energy, a prediction must be made that is a specific sequence of space-time configurations that has to be made to put the free energy detectors on the free energy. That sequence of space time configurations is really an algorithm, and an algorithm is a prediction. An algorithm is the stable space-time sequences that reliably unlock free-energy.

Figure 15:
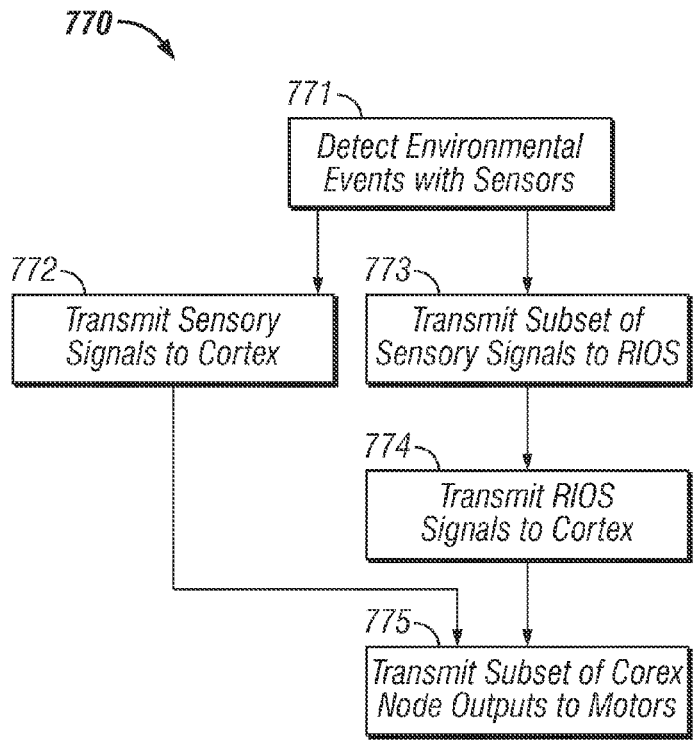
FIG. 15 illustrates a flow chart explaining the information flow between core subsystems, in accordance with the disclosed embodiments.

FIG. 15 illustrates a flow chart of operations indicative of a method 770 of information flow between core submodules, in accordance with the disclosed embodiments. As illustrated at block 771 in FIG. 15, one or more sensors (e.g., sensor 120 in FIG. 1) can detect events in the environment (e.g., environment 130 in FIG. 1) and transmit it to an RIOS (e.g., RIOS 135) and the sensory cortex. The RIOS processes a subset of sensory data and transmits a highly redundant reward signal to many locations within the cortex as illustrated at block 773 and 774. The cortex learns about the environment through self organizing logic pathways that predict reward signal. As illustrated at block 775, the cortex transmits the output of a subset of cortical nodes to the motors for performing the task, thus closing the environmental interaction loop.

Figure 16:
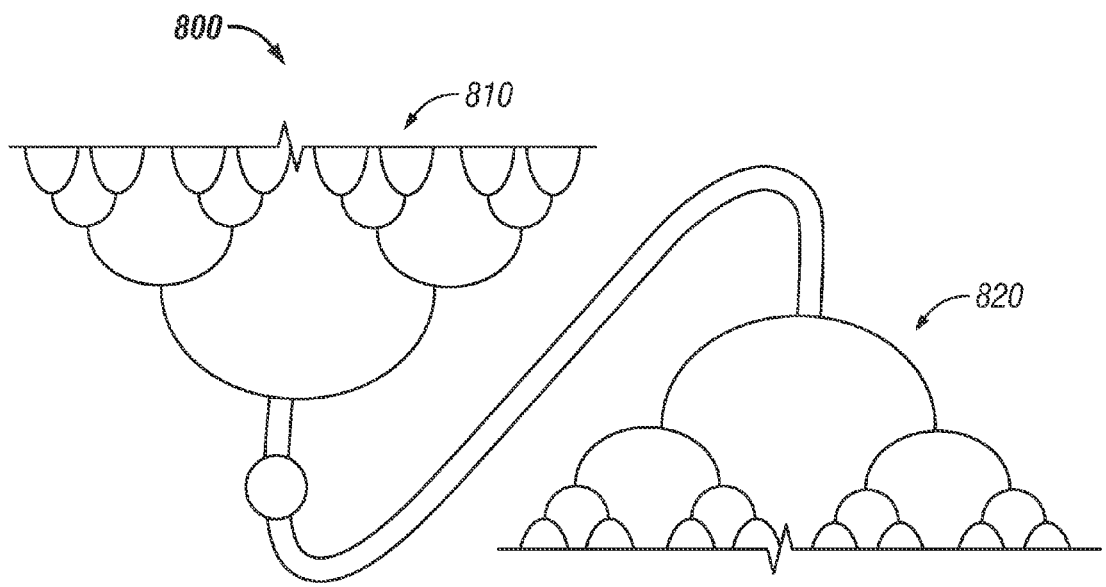
FIG. 16 illustrates a schematic diagram of neuron, in accordance with the disclosed embodiments.

FIG. 16 illustrates a schematic diagram of a neuron 800, in accordance with the disclosed embodiments. The neuron 800 contains two sets of synapses such as dendrites 810 and axon 820. A plasticity rule operates on the dendritic weights, but this process is gated by its axonal weights. Demonstration of the plasticity rules capability of extracting independent components of a data stream is absolutely vital, as these forms the base "logic" that the system will use to build higher-order circuits.

Random and non-random sensory data are projected to the neuron's dendrites. For random input, the dendritic weight vector is unstable. That is, it constantly explores its phase/feature space. For a given non-random spatial-temporal input, the weight vector converges to one of potentially multiple stable independent component state. If the input contains only vertical gratings, then a vertical edge filter is a stable component. If the input contains only vertical and horizontal gratings, then vertical and horizontal edge filters are the stable states. If the input contains vertical, horizontal, and diagonal gratings, then vertical, horizontal, and diagonal edge filters are the state components and so on.

In noise-induced meta-stability of dendritic states, if it is known that the plasticity rule will converge the dendritic weights to one of N independent component states, a process that allows the neuron to transition between these states via noise must exist. Mechanisms include adding synaptic noise. The competitive learning via lateral inhibition shows that a set of neurons each receiving the same structured input but inhibiting each other will converge to different dendritic states.

To enable growth and pruning, some large potential projective field for the synapse are defined. All the neurons in a projective field can be explored, but not all at the same time. Each synapse is given a state such as "ON" and "OFF". "OFF" synapses are not used; "ON" synapses are used and undergo synaptic plasticity. In a physical sense, ON synapse represent the outputs synapses of a neuron while OFF synapses represent potential synapse should growth occur. In an electronic framework, this distinction between ON and OFF synapses may be realized through a routing network, for example.

Each neuron has a projective and receptive state. Receptive neurons are susceptible to state change driven by synaptic noise and do not grow axonal projections. Projective neurons are resistant to state change driven by synaptic noise and grow axonal projections. The transition between projective and receptive states is the amount of energy received from output weights minus the metabolic energy of self-repair.

$$k \sum_{i=0}^{M_{ON}} i$$

The metabolic tax can be computed as defined in equation (22) below:

$$e_m(t)= \tag{22}$$

$M_{ON}$ is the number of axonal ON synapses and k is a constant that represents total amount energy needed to maintain one axonal pathway. This is an approximation that does not factor in a dendritic branching structure but rather treats each axonal projection as one unit. The metabolic tax is a measure of the physical size of the axonal arbor. Axonal arbors take energy to repair/maintain their structure in proportion to their size.

A strong output weight means it is useful to the downstream neuron in maintaining its state, and weak weight means that it is not. The acquired energy can be computed as defined in equation (23) below:

$$e(t) \tag{23}$$

The total acquired energy savings can be computed using the equation (24) as follows:

$$\xi_{t+1} = \xi_t + e(t) - e_m(t) \tag{24}$$

If $\xi_t$ is positive state, it is projective, and if $\xi_t$ is negative state, it is receptive. If the neurons are in the projective state, savings are converted into growth of axonal structure. A constant "G" can be defined which represents the amount of energy needed to grow one axonal connection. If $\xi_t$ exceeds "G", one of the OFF synapses is turned to "ON" and "G" is subtracted from the savings. If the neurons are in the receptive state, the weakest "ON" synapse can be pruned. That is, the weakest axonal synapse can be turned "OFF".

A sub-population can be defined which spread uniformly throughout the network that always fire when reward is present. The reward neurons represent the most abundant source of "prediction". It is important that the reward neurons numbers are finite and unchanging. That is, they must represent a limited "prediction resource" that other neurons must compete for. Given some structured input data, the reward neurons are activated when some stimulus is present. The plot of total magnitude of the reward neuron's dendritic synapses over time represents the evolving circuit's ability to predict the reward.

It will be appreciated that variations of the above disclosed apparatus and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A framework for the evolution of extrinsic logic states, said framework comprising:
   a computing device; and
   a collection of interacting nodes operating an anti-hebbian and hebbian plasticity rule such that said collection of interacting nodes is susceptible to thermodynamic noise in the absence of a positive feedback reward with respect to said anti-hebbian and hebbian plasticity rule, said collection of interacting nodes comprising a module capable of occupying computationally complete attractor states, wherein said module communicates and interacts with said computing device.

2. The framework of claim 1 wherein said computing device comprises a processor.

3. The framework of claim 1 wherein said computing device comprises a memory.

4. The framework of claim 1 wherein said computing device comprises a processor and a memory that communicates with one another.

5. The framework of claim 1 further comprising a collection of interacting modules comprising a network that configures itself based on an application of said positive feedback reward, wherein said collection of interacting modules and said collection of interacting nodes communicate and interact with said computing device.

6. The framework of claim 1 wherein said positive feedback reward with respect to said anti-hebbian and hebbian plasticity rule is gated.

7. The framework of claim 2 wherein said positive feedback reward is gated via a prediction of a signal.

8. The framework of claim 2 wherein said positive feedback reward is gated via a detection of free energy.

9. The framework of claim 2 wherein said positive feedback reward is gated via a detection of a human smile.

10. The framework of claim 1 wherein nodes among said collection of interacting nodes compete with each other for said positive feedback reward within said framework.

11. The framework of claim 8 further comprising at least one sensor for said detection of said free energy.

12. The framework of claim of 9 further comprising at least one sensor for said detection of said human smile.

13. A framework for the evolution of extrinsic logic states, said framework comprising:
a computing device;
a collection of interacting nodes operating an anti-hebbian and hebbian plasticity rule such that said collection of interacting nodes is susceptible to thermodynamic noise in the absence of a positive feedback reward with respect to said anti-hebbian and hebbian plasticity rule, said collection of interacting nodes comprising a module capable of occupying computationally complete attractor states; and
a collection of interacting modules comprising a network that configures itself based on an application of said positive feedback reward, wherein said collection of interacting modules and said collection of interacting nodes communicate and interact with said computing device and wherein nodes among said collection of interacting nodes compete with each other for said positive feedback reward within said system.

14. The framework of claim 13 wherein said positive feedback reward with respect to said anti-hebbian and hebbian plasticity rule is gated.

15. The framework of claim 14 wherein said positive feedback reward is gated via a prediction of a signal.

16. The framework of claim 14 wherein said positive feedback reward is gated via a detection of free energy.

17. The framework of claim 14 wherein said positive feedback reward is gated via a detection of a human smile.

18. A framework for the evolution of extrinsic logic states, said framework comprising:
a cortex; and
a collection of interacting nodes operating an anti-hebbian and hebbian plasticity rule such that said collection of interacting nodes is susceptible to thermodynamic noise in the absence of a positive feedback reward with respect to said anti-hebbian and hebbian plasticity rule, said collection of interacting nodes comprising a module capable of occupying computationally complete attractor states, wherein said module communicates and interacts with said cortex.

19. The framework of claim 18 wherein said cortex comprises a computing device.

20. The framework of claim 18 further comprising a collection of interacting modules comprising a network that configures itself based on an application of said positive feedback reward, wherein said collection of interacting modules and said collection of interacting nodes communicate and interact with said computing device.

* * * * *